Patented Oct. 3, 1922.

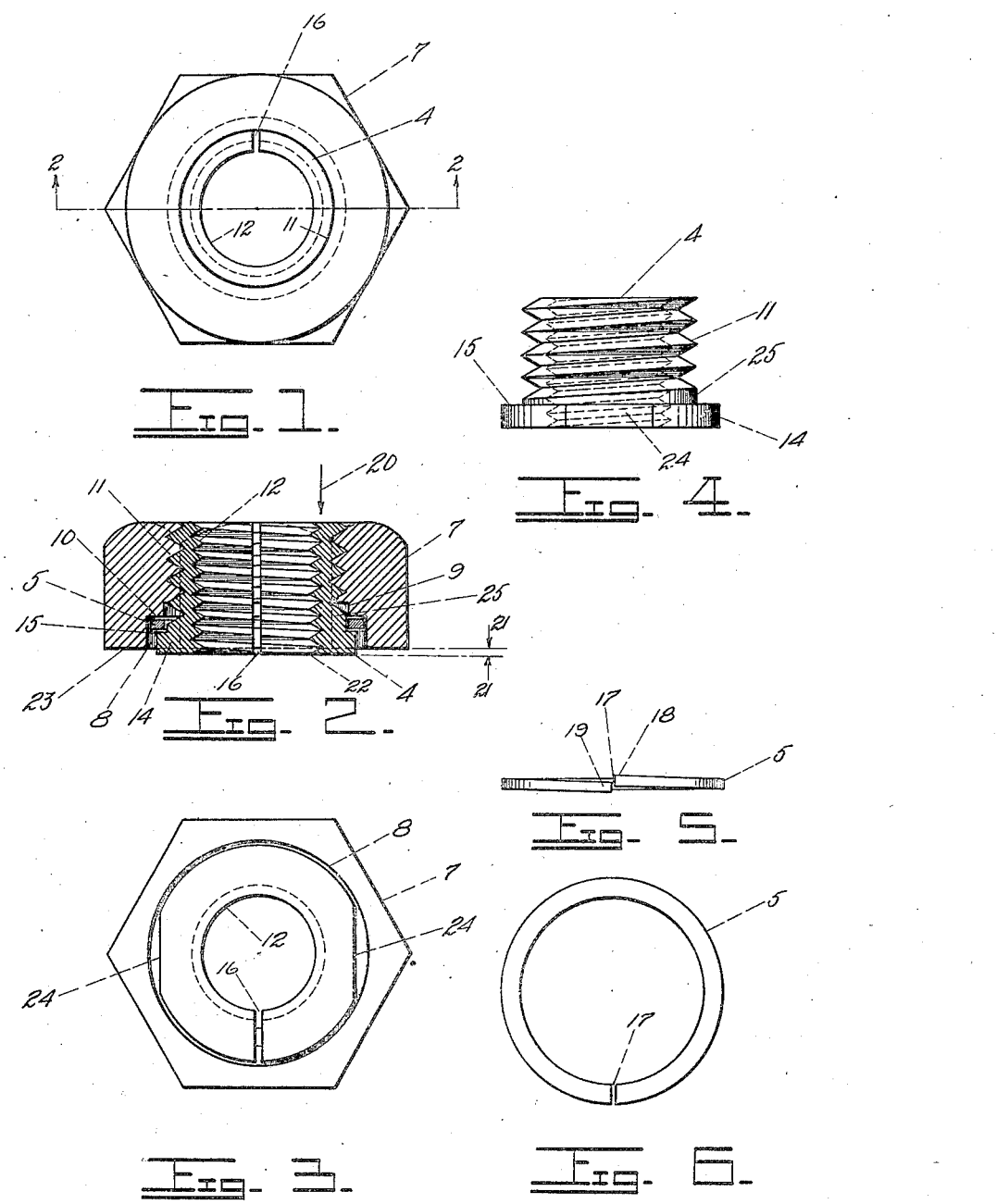

1,431,076

UNITED STATES PATENT OFFICE.

GUSTAV A. YUNGKRUGER, OF LANCASTER, PENNSYLVANIA.

LOCK NUT.

Application filed January 25, 1922. Serial No. 531,640.

*To all whom it may concern:*

Be it known that I, GUSTAV A. YUNG-KRUGER, a citizen of the United States, residing at Lancaster, in the county of Lancaster and State of Pennsylvania, have invented new and useful Improvements in Lock Nuts, of which the following is a specification.

The object of this invention is to provide a nut which is self locking and which has an action whereby the interlocking threads which carries the principal part of the load are forced more firmly into mesh as the nut is drawn tighter, and thereby affecting a condition similar to a nut screwed upon a bolt in which the threads fit exceptionally tight. The object is that this action does not begin until the nut is about to be drawn up firmly to its final seat, and previous to the beginning of this action the threads fit freely and the nut is easily turned on the bolt.

A further object is to provide a device by which the objects above set forth may be obtained through the use of standard nuts, such as are now on the market, it being necessary to make only a slight modification, the character of which is cheap and simple to perform, and which will be fully understood from the following detail description, taken in connection with the accompanying drawing, and in which similar numerals refer to similar parts throughout the several views.

Fig. 1, is a plan of the nut shown in Fig. 2.

Fig. 2, is a sectional view of Fig. 1 taken on line 2—2, and shows the principal features of this invention.

Fig. 3, is a bottom view of the nut shown in Fig. 2.

Fig. 4, is a detail drawing of the threaded bushing shown at 4 in Fig. 2.

Fig. 5, is a detail drawing of the washer 5 shown in Fig. 2.

Fig. 6, is a plan view of the washer shown in Fig. 5.

On the drawing 7 indicates a standard hexagon nut to which a slight modification is made in the form of a counterbore 8 and 9, a shoulder being formed as shown at 10.

The bushing 4 is threaded on its outside diameter to fit the nut 7 as shown at 11; the inside of the bushing is threaded as shown at 12 to fit a bolt or screw upon which the nut is to be placed.

The bushing 4 is provided with a head 14, which forms a shoulder 15, and is also split the entire length on one side as shown at 16. A washer 5 is adapted to lay between the shoulders 10 and 15, the same being split as shown at 17 and sprung as shown at 18 and 19.

The action of this nut while being screwed on a bolt is as follows:

The nut is started on the thread of the bolt and turned to screw on the thread, moving forward in the direction indicated by the arrow 20. The normal inside diameter of the bushing 4 is such so that the threads 12 freely fit the threads of the bolt. The turning of the nut 7 carries with it the bushing 4, screwing forward if necessary upon the thread 11 until the ends 18 and 19 of the washer 5 is clamped between the shoulders 10 and 15. The natural stiffness of the washer 5 should be such so that the bushing 4 will be carried forward with the nut 7 while in the form shown in Fig. 5, and against any ordinary amount of friction caused by the thread 12 running on the thread of the bolt. The sizes of the various parts should be such so that the bushing normally extends beyond the nut 7 as indicated between the arrows 21.

Now it is apparent that as the nut moves forward the face 22 of the bushing 4 first comes in contact with the surface upon which the nut clamps, and that further turning of the nut 7 will flatten the washer 5 between the shoulders 10 and 15; and the surfaces 22 of the bushing 4 and 23 of the nut 7 will become flush. By the time this occurs the reaction of the pressure exerted on the washer 5, which takes effect on the beveled surfaces of the thread 11, will cause the bushing 4 to contract in diameter thereby causing the threads 12 to mesh with the threads in the bolt with very great pressure. This nut is now firmly locked to the bolt and will stay at this place regardless of the amount of vibration occurring in the elements clamped.

To remove the nut it is only necessary to turn it in the opposite direction to that required for putting it on, as is the common practice with the plain standard nuts.

If for any reason, when removing this nut, the bushing 4 should remain tight on the bolt, and the nut 7 screw off the thread 11; then to facilitate the removing of the bushing 4, I provide two flat sides on the head 14 as shown at 24 upon which a wrench can be adapted to turn the bushing.

If the nut 7 and bushing 4 be made of machine steel such as is commonly employed for bolts and nuts, it is preferable that the washer 5 be made of cold rolled steel or some other grade having substantially the same relative ductility; this is desirable so that it does not require excessive pressure to flatten, or even crush this washer if necessary, between the shoulders 10 and 15.

It is obvious that it is not necessary that the washer 5 be split as shown at 17, for it would perform its function very well if it was an endless ring, but then it should be of sufficient thickness so that a slight crushing effect is necessary to bring flush the surfaces 20 of the bushing 4 and 23 of the nut 7. The object of maintaining this condition is to assure that during the time that this nut is being drawn firmly to its final seat, there is a force endeavoring to screw the bushing 4 tighter against the element which it is clamping; this force acting in unison with the force heretofore described, for contracting the diameter of the bushing 4.

It is to be observed that the nut 7 is no different from a standard U. S. hexagon nut except for the slight modification of forming the counterbore 8 and 9. It is obvious that this is a simple and cheap operation. The portion 8 of the counterbore being solely to accommodate the head 14 of the bushing 4 and the washer 5; the portion 9 being solely to accommodate the body portion 25 of the bushing 4, it being a difficult matter in practice to form the thread 11 in a perfect manner directly up against the shoulder 15.

I prefer the following system when designing various sizes of lock nuts of the character herein shown and described:—for a ½″ bolt having a U. S. standard thread; the thread 12 should be formed to fit the bolt, but the nut 7 should be a regular U. S. standard ¾″ nut, and the thread 11 be adapted to screw into it; for a ⅝″ bolt the nut 7 should be of the ⅞″ size; for ¾″ bolt a 1″ nut should be employed, etc.

Having thus described my invention, what I claim and desire to secure by United States Letters Patent is as follows:

1. The combination with a nut having a V-threaded hole, of a counterbore in said V-threaded hole which forms a shoulder, a bushing having an internal thread to fit a bolt and an external thread adapted to screw into said V-threaded hole of the nut, a slit through the wall of said bushing, a head on the end of said bushing which forms a shoulder adapted to co-act with the shoulder formed by said counterbore, and a ductile washer interposed to be compressed between the shoulders formed by said counterbore and said head.

2. The combination with a nut having a V-threaded hole, of a counterbore in said V-threaded hole which forms a shoulder, a bushing having an internal thread to fit a bolt and an external thread adapted to screw into said V-threaded hole of the nut, a slit through the wall of said bushing, a head on the end of said bushing which forms a shoulder adapted to co-act with the shoulder formed by said counterbore, flat sides on said head to accommodate a wrench, and a ductile washer interposed to be compressed between the shoulders formed by said counterbore and said head.

3. The combination with a nut having a V-threaded hole, of a counterbore in said V-threaded hole which forms a shoulder, a bushing having an internal thread to fit a bolt and an external thread adapted to screw into said V-threaded hole of the nut, a slit through the wall of said bushing, a head on the end of said bushing which forms a shoulder adapted to co-act with the shoulder formed by said counterbore, and a spring washer interposed to be compressed between the shoulders formed by said counterbore and said head.

In testimony whereof I affix my signature.

GUSTAV A. YUNGKRUGER.